Patented Nov. 5, 1929

1,734,682

UNITED STATES PATENT OFFICE

WILHELM LOMMEL AND HEINRICH MÜNZEL, OF WIESDORF, AND HERMANN STÖTTER AND BERTHOLD WENK, OF LEVERKUSEN, GERMANY, ASSIGNORS TO I. G. FARBENINDUSTRIE AKTIENGESELLSCHAFT, OF FRANKFORT-ON-THE-MAIN, GERMANY

MOTH-PROOF ARTICLE AND PROCESS OF PREPARING IT

No Drawing. Application filed July 2, 1927, Serial No. 203,255, and in Germany July 13, 1926.

The present invention relates to moth-proof articles and a process of preparing them which consists in depositing in or upon materials liable to attack by moths, for example wool, skins, hair, feathers and the like, a compound of the general formula:

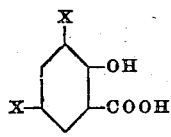

wherein one X respresents a substituent of the group including halogen and sulfur, and the other X represents hydrogen or any substituent, and wherein the benzene nucleus may be further substituted.

Para-cresotinic acid has already been suggested as a protective material against attack by moths, but we have found that the efficiency of the compounds of the above given general formula is by far greater than the efficiency of the compounds of the para-cresotinic acid type hitherto used for said purpose.

As examples of acids which find application in accordance with our new invention, the following may be mentioned: 1-hydroxy-4-chloro-2-benzoic acid, 1-hydroxy-4.6-dichloro-2-benzoic acid, 1-hydroxy-6-methyl-4-bromo- or chloro-2-benzoic acid, 1-chloro-2-hydroxy-3-naphthoic acid, sulfurized 1-hydroxy-4-chloro-2-benzoic acid, sulfurized 1-hydroxy-4-methyl-2-benzoic acid, sulfurized 1-hydroxy-6-methyl-2-benzoic acid and sulfurized 2-hydroxy-3-naphtholic acid.

The sulfurized oxy carbonic acids can be obtained by treating oxy carbonic acids with chloride of sulfur ($S_2Cl_2$). By this operation principally products of the general formulæ are produced:

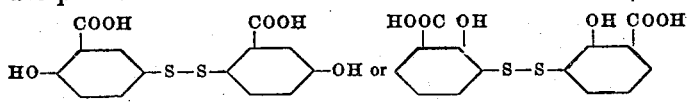 or 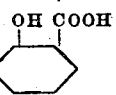

Furthermore the mixture of the directly used sulfurized bodies contains also such ones in which the sulpfurfur bridge consists in 1 or 3 atoms of sulfur. These sulfurized compounds dissolve in the same manner as the unsulfurized bodies in aqueous alkalies and can be precipitated again by acids from these solutions.

Instead of these primary substances, their derivatives and condensation products, for example with amines, hydrazines and the like can be employed with similar satisfactory results. Such products are f. i. the anilids, halogenanilids, etc., of the above mentioned acids.

The application of the said protective substances can be effected in a variety of ways, such as by immersing the materials to be moth-proofed in the respective solutions in water or organic solvents, centrifuging or pressing and drying. The treatment can be carried out at ordinary temperature or with the application of heat and may be combined if so desired with other processes to which the materials are subjected. It is also possible to spray the materials with the solutions, care being taken to insure uniformity of incorporation of the moth-proofing substances. Other customary methods of application will readily suggest themselves to those skilled in the art. Thus, for instance, it is possible to bring the materials to be protected against attack by moths into close contact with a finely ground powder of the above mentioned substances by rolling them for some hours with these substances in drums.

The most advantages concentrations of the solutions change according to their method of use. For instance moth-proofing articles can be already produced with a concentration of 1%.

Having now particularly described and ascertained the nature of our said invention and in what manner the same is to be performed, we declare that what we claim is:

1. A moth-proof article comprising a material liable to attack by moths having incorporated or combined therewith a compound of the general formula:

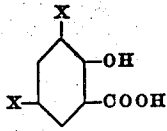

wherein one X represents a substituent of the group including halogen and sulfur, and the other X represents hydrogen or any substituent, and wherein the benzene nucleus may be further substituted.

2. A moth-proof article comprising a material liable to attack by moths having incorporated or combined therewith a compound of the general formula:

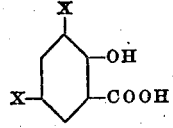

wherein one X represents a halogen atom, and the other X an alkyl residue.

3. A moth-proof article comprising a material liable to attack by moths having incorporated or combined therewith 1-hydroxy-6-methyl-4-chloro-2-benzoic acid of the formula:

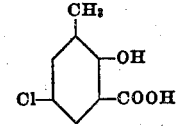

being a colourless crystalline substance melting at 226° C. easily soluble in alcohol and almost insoluble in water.

4. In a process for protecting materials liable to attack by moths, the step which consists in depositing in or upon the materials a compound of the general formula:

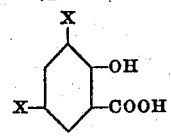

wherein one X represents a substituent of the group including halogen and sulfur, and the other X represents hydrogen or any substituent, and wherein the benzene nucleus may be further substituted.

5. In a process for protecting materials liable to attack by moths, the step which consists in depositing in or upon the materials a compound of the general formula:

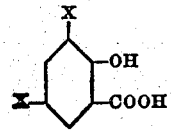

wherein one X represents a halogen atom, and the other X represents an alkyl residue.

6. In a process for protecting materials liable to attack by moths, the step which consists in depositing in or upon the materials 1-hydroxy-6-methyl-4-chloro-2-benzoic acid of the formula:

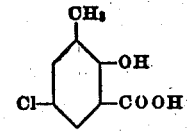

being a colourless crystalline substance melting at 226° C. easily soluble in alcohol and almost insoluble in water.

In testimony whereof we have hereunto set our hands.

WILHELM LOMMEL.
HEINRICH MÜNZEL.
HERMANN STÖTTER.
BERTHOLD WENK.